(12) United States Patent
Wakabayashi et al.

(10) Patent No.: US 6,524,204 B2
(45) Date of Patent: Feb. 25, 2003

(54) ROCKER JOINT FOR CVT CHAIN BELT WITH STEPPED PINS PRESS FIT IN THE CENTER OF THE GUIDE LINKS

(75) Inventors: Shozo Wakabayashi, Mie (JP); Niroyuki Takeda, Mie (JP)

(73) Assignee: Borg-Warner Automotive, K.K., Nabari (JP)

( * ) Notice: Subject to any disclaimer, the term of this patent is extended or adjusted under 35 U.S.C. 154(b) by 10 days.

(21) Appl. No.: 09/776,333

(22) Filed: Feb. 2, 2001

(65) Prior Publication Data

US 2002/0107100 A1 Aug. 8, 2002

(30) Foreign Application Priority Data

Feb. 24, 2000 (JP) .................................... 2000-047530

(51) Int. Cl.⁷ .............................................. F16G 13/02
(52) U.S. Cl. ...................................... 474/215; 474/229
(58) Field of Search ................................. 474/214, 215, 474/216, 217, 229

(56) References Cited

U.S. PATENT DOCUMENTS

| 1,822,749 | A | * | 8/1931 | Rothman | 474/214 |
| 1,887,137 | A | * | 11/1932 | Morse | 474/215 |
| 3,049,933 | A | | 8/1962 | Besel | 74/230.17 |
| 5,318,485 | A | | 6/1994 | Bateman | 474/245 |
| 5,439,423 | A | | 8/1995 | Okuwaki et al. | 474/245 |
| 5,453,058 | A | | 9/1995 | Reese et al. | 474/206 |
| 5,645,502 | A | | 7/1997 | Wakabayashi et al. | 474/85 |
| 5,728,021 | A | | 3/1998 | van Rooij et al. | 474/229 |
| 6,142,903 | A | | 11/2000 | Heinrich | 474/215 |

FOREIGN PATENT DOCUMENTS

| EP | 0 362 963 A1 | 4/1990 |
| FR | 2 772 101 | 6/1999 |

* cited by examiner

Primary Examiner—David A. Bucci
Assistant Examiner—Vicky A. Johnson
(74) Attorney, Agent, or Firm—Sidley Austin Brown & Wood LLP; Greg Dziegielewski

(57) ABSTRACT

A power transmission chain belt has a rocker joint to reduce power transmission loss and to reduce the surface pressure acting on the connecting pin while maintaining bendability of the entire chain. The chain is formed of multiple inner links, each having a pair of pin apertures. The links are interleaved in the transverse and longitudinal directions and are connected by connecting pin inserted in pin apertures. The connecting pin includes a center pin. Arranged at the center of pin aperture are curved faces of which at both of its ends contact pulley friction surface and of a pair of rocker pins, which are arranged on both sides of center pin in the pin aperture and which are shorter than the center pin. In addition, the outer link is arranged on the outside of outermost inner link and step part of center pin is press-fitted into a pair of pin apertures in outer link.

4 Claims, 3 Drawing Sheets

ROCKER JOINT FOR CVT CHAIN BELT WITH STEPPED PINS PRESS FIT IN THE CENTER OF THE GUIDE LINKS

The subject matter of this application relates to the subject matter of application Ser. No. 09/775,915, filed Feb. 2, 2001, entitled "Rocker Joint For CVT Chain Belt With Stepped Pins."

This invention relates to a power transmission chain belt and, in detail, to a rockerjoint for a continuously variable transmission (CVT) chain belt having stepped pins that are press fit in the center of the guide links.

BACKGROUND OF THE INVENTION

A link plate chain, as disclosed in Laid-Open Patent H11-241753, is used conventionally as a power transmission chain belt. As shown in FIGS. 1 and 3 and in column 6, lines 18–33 of the said patent publication, in this link plate chain, interleaved chain link plates 1 and outside link plates 2 are connected pivotally by a pair of oscillation pieces (connecting pin) 3, which are joint members.

As shown in FIG. 3 of the said publication, a pair of oscillation pieces 3 have the same length in this link plate chain and each of oscillation pieces 3 contacts with a conical pulley for power transmission by the frictional force between the said pulley and oscillation piece.

When a chain is wound on the pulley, oscillation pieces 3 roll on an oscillation surface (rolling surface) 6, and, at that time, a pair of oscillation pieces 3 rotate in the opposite direction inside a pin aperture 4. Therefore, power is lost because of the slipping that occurs between the end face of the oscillation piece and the pulley.

Recently, a chain belt power transmission device has been used under high load and, at the same time, it is required to have high wear-resistance. However, when a conventional chain belt is used under heavy load, very high contact surface pressure is generated on the convex-to-convex contact surface of the connecting pin and, as a result, pitting wear occurs on the rolling surface of the connecting pin, so that the conventional chain belt cannot sufficiently satisfy the requirement for wear-resistance.

The radius of curvature of the rolling surface of the connecting pin can decrease the contact surface pressure among connecting pins but a larger radius of curvature of the rolling surface impedes bending of link plates and bendability of the entire chain belt and, as a result, its winding on a small-diameter pulley becomes more difficult. Therefore, increasing the radius of curvature of the rolling surface is limited from the viewpoint of ensuring bendability of the entire chain belt.

This invention addresses such a conventional problem and it offers a power transmission chain belt which can reduce the surface pressure acting on the connection pin while maintaining bendability of the entire chain belt.

SUMMARY OF THE INVENTION

Construction of the connecting pin of the present invention is detailed below with the aid of FIG. 3. In the figure, inner links 2a, 2b, put together at a right angle to the paper surface, are bent to each other. Incidentally, in such a case, the bending angle is given as α. Connecting pin 3 that pivotally supports said inner links 2a, 2b is inserted in pin aperture 22 of the said inner links 2a, 2b.

Connecting pin 3 is composed of center pin 31 arranged at the center of pin aperture 22 and a pair of rocker pins arranged on both sides of the center pin. Both side faces 31a of center pin 31 are convex curved and a convex curved face 32a, which contacts both side faces 31a of center pin 31, is formed in rocker pin 32.

Now, in a conventional link plate chain, rolling contact at angle a on the rolling surface of a pair of connecting pins (oscillation pieces) is necessary to produce bending angle α.

Whereas, in the present invention, as shown in FIG. 3, rolling contact at angle α/2 of each rocker pin 32 suffices to produce a bending angle α between adjacent inner links 2a, 2b, because rocker pins 32 are arranged on both sides of center pin 31. Therefore, rolling contact of a rocker pin at one half of the necessary angle of the rolling contact suffices for the present invention so that the radius of curvature of each pin can be increased by that much and thereby the surface pressure of the contact surface of each pin can be reduced and wear-resistance improved.

In the present invention, both end faces of the center pin contact with the pulley's friction surface so that, when a chain is wound on a pulley, the end face of the center pin only contacts the pulley's friction surface and the end face of the rocker pin does not contact. Thereby, generation of slippage between the pin's end face and the pulley is prevented, loss of power transmission is reduced and heat generation from the operation is reduced.

The preferred shape of the center pin cross-section is approximately a Japanese drum shape, or a general ellipse. This is a shape in which the centers of both side faces are convex curved outward. Concave or convex curved faces are formed on the opposing faces of the convex curved face of the rocker pin.

Steps are formed at the tip of the center pin and the stepped part is press-fitted into the pin aperture of the outer link plate. In such case, detachment of the center pin from the link plate is prevented assuredly.

DETAILED DESCRIPTION OF THE PREFERRED EMBODIMENTS

Figure 1:
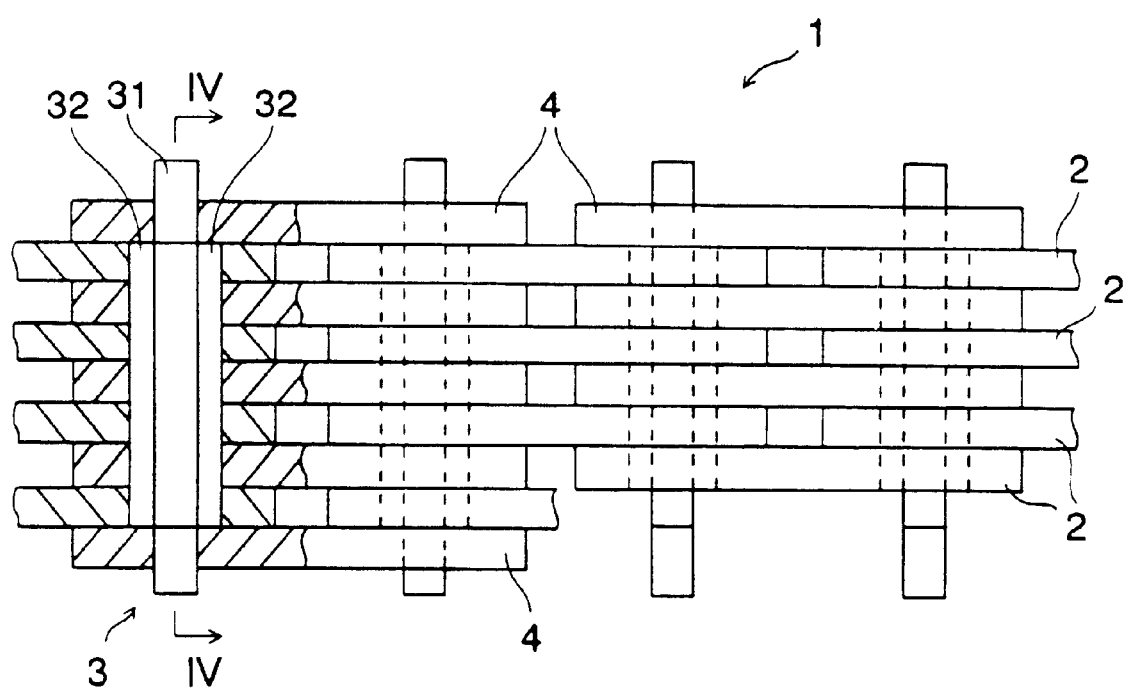
FIG. 1 is a top view of the chain belt of one practical example of this invention.
Figure 2:
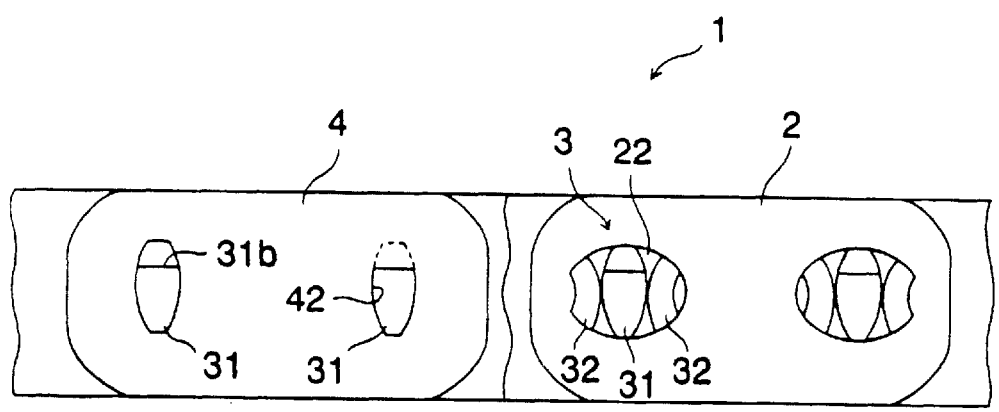
FIG. 2 is a front view of the chain belt of FIG. 1.
Figure 3:
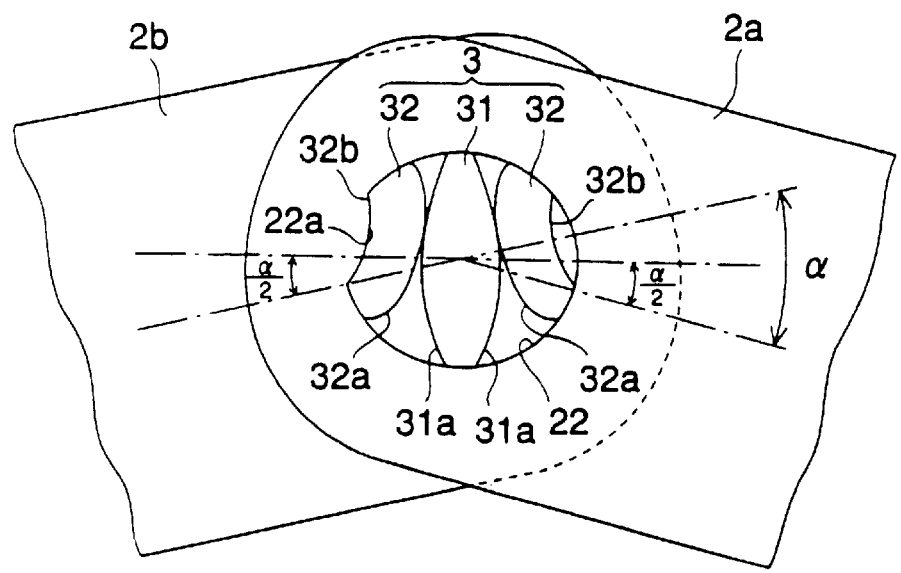
FIG. 3 is an enlargement of the connecting pin of the chain belt of FIG. 1.
Figure 4:
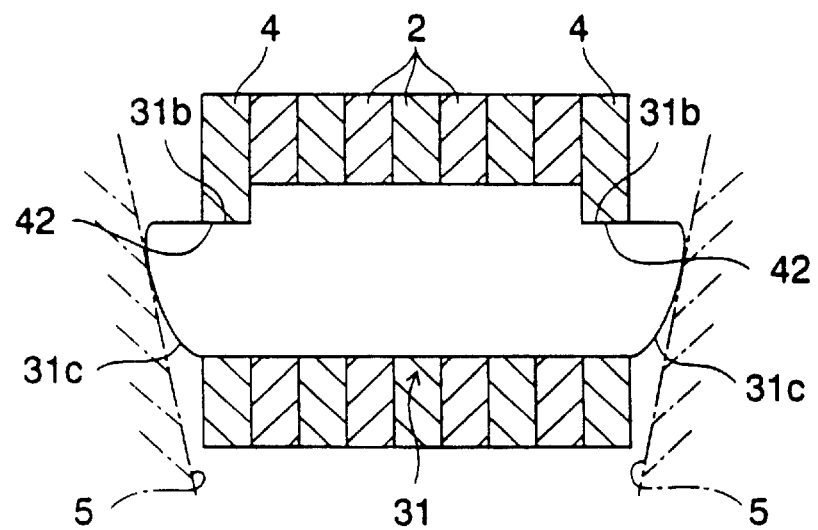
FIG. 4 is a sectional view along Section IV—IV of FIG. 1.

A practical example of this invention is explained below with the aid of the attached figures. FIG. 1 is a top view of the power transmission chain belt of a practical example of this invention (hereafter, chain belt). FIG. 2 is a front view of the chain belt of FIG. 1. FIG. 3 is an enlargement of the connecting pin of the chain belt of FIG. 1. FIG. 4 is the cross-section IV—IV of FIG. 1.

As shown in FIGS. 1 and 2, chain belt 1 has multiple inner links 2, each having a pair of pin apertures 22. The links are interleaved in the transverse and longitudinal directions and the inner links 2 are connected pivotally by connecting pins 3 that are inserted in the pin apertures 22 of inner links 2.

Connecting pin 3 is composed of center pin 31 arranged at the center of pin aperture 22 and a pair of rocker pins 32, arranged on both its sides. As shown in FIG. 3, center pin 31 has convex curved faces 31a on both its sides and it has an approximate Japanese-drum-like cross-section. Rocker pin 32 has convex curved face 32a that contacts with side face 31a of center pin 31. On the opposite side of convex curved face 32a of rocker pin 32, concave curved face 32b is formed and another concave curved face 32b of rocker pin 32 contacts the seat face 22a formed in pin aperture 22 of inner link 2.

Outer pin 31 is longer than rocker pin 32 and it penetrates pin aperture 42 of outer link 4 and extends to the outside of outer link 4. As shown in FIG. 4, step 31b is formed at the tip of center pin 31 and said stepped part 31b is press-fitted into pin aperture 42 of outer link 4. Thereby, falling off of center pin 31 is prevented. Curved faces 31c are formed on both ends of center pin 31. These curved faces 31c contact the pulley's friction surface 5 for frictional power transmission across the said faces and pulley.

Inner links 2a, 2b, placed together in a bent state at a right angle to the paper surface, are shown in FIG. 3, which shows the details of the connecting pin of chain belt 1. If the bending angle between inner links 2a, 2b is given as $\alpha$, then rolling contact at angle $\alpha/2$ per each rocker pin 32 produces a bending angle $\alpha$ between adjacent inner links 2a, 2b because rocker pins 32 are arranged on both sides of center pin 31.

Whereas in a conventional link plate chain, rolling contact at angle $\alpha$ is necessary for the rolling surface of each oscillation piece to produce a bending angle $\alpha$.

Whereas in the practical example, one half of the angle necessary for rolling contact per each rocker pin 32 suffices so that the radius of curvature of each of pins 31, 32 can be increased by that much and the contact surface pressure of the said pins can be reduced and their wear resistance improved.

In the practical example, curved faces 31c at both ends of the center pin 31 contact with the pulley's friction surface 5. Therefore, when a chain is wound on a pulley, the only the end face of the center pin contacts with the pulley's friction surface and the end face of the rocker pin 32 does not contact. Thereby, slipping between the pin's end face and the pulley's friction surface is prevented and power transmission loss is reduced.

Incidentally, concave curved seat surface 22a is formed in the pin aperture 22 of inner link 2 in the said practical example, but convex curved surface can be used as the seat surface. In this case, convex curved faces are formed on both sides of rocker pin 32, 33 and rocker pins 32, 33 have an approximate Japanese-drum-like cross-section, similarly to center pin 31.

As shown above, in the power transmission chain belt of this invention, the connecting pin is composed of a center pin, arranged at the center of the pin aperture, and a pair of rocker pins, arranged on both sides of the said outer pin, so that rolling contact of one half of the necessary bending angle per each rocker pin suffices to produce the necessary bending angle of the chain belt. Thereby, the radius of curvature of each pin can be increased by that much and, as a result, the contact surface pressure of each pin is reduced while bendability of the entire chain belt is maintained and the chain belt's wear resistance is improved.

In addition, only the end faces of the center pin contact with the pulley's friction surface in this invention, so that slipping between the pin surface and the pulley's friction surface is suppressed and power transmission loss is reduced.

What is claimed is:

1. A power transmission chain belt, comprising:

multiple interleaved rows of inner links, pin members connecting adjacent rows of inner links, each inner link defining a pair of apertures for receiving said pin members, each of said pin members including a center pin arranged in the center of an aperture of said inner link, a pair of rocker pins arranged on both sides of said center pin, said center pin having both sides with convex curved faces, both ends of said center pin contacting the friction faces of a pulley, said rocker pins having convex curved sides in contact with said two sides of said center pin, each of said rocker pins having a shorter length than that of said center pin, a plurality of outer links placed outside the outermost inner links, each of said outer links having a pair of apertures for press-fitting the center pins.

2. The power transmission chain belt of claim 1, wherein said center pin has a general ellipse shape in cross-section.

3. The power transmission chain belt of claim 1, wherein said faces opposite to said convex curved faces of said rocker pins are curved convex.

4. The power transmission chain belt of claim 1, wherein said outer pin has stepped portions on its ends, said stepped portions being press-fitted into apertures of said outer links.

* * * * *